(12) United States Patent
Matsumoto et al.

(10) Patent No.: US 7,257,662 B2
(45) Date of Patent: Aug. 14, 2007

(54) STATUS REPORTING APPARATUS AND STATUS REPORTING METHOD

(75) Inventors: Tatsuyasu Matsumoto, Kawasaki (JP); Tatsuya Kuwayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/322,360

(22) Filed: Jan. 3, 2006

(65) Prior Publication Data

US 2006/0161708 A1 Jul. 20, 2006

(51) Int. Cl.
*G06F 13/14* (2006.01)
*G06F 13/36* (2006.01)

(52) U.S. Cl. ............... 710/305; 710/244; 370/477
(58) Field of Classification Search ............ 710/22, 710/107, 110, 113, 116, 118, 243, 309; 709/228; 713/100; 370/447, 448
See application file for complete search history.

(56) References Cited

U.S. PATENT DOCUMENTS

| | | | | |
|---|---|---|---|---|
| 5,369,748 A * | 11/1994 | McFarland et al. | ......... | 710/309 |
| 5,528,767 A * | 6/1996 | Chen | ......... | 710/113 |
| 5,546,548 A * | 8/1996 | Chen et al. | ......... | 710/116 |
| 5,557,753 A * | 9/1996 | Suenaga et al. | ......... | 710/107 |
| 5,619,727 A * | 4/1997 | Chen et al. | ......... | 710/22 |
| 5,740,381 A * | 4/1998 | Yen | ......... | 710/113 |
| 5,758,105 A * | 5/1998 | Kelley et al. | ......... | 710/113 |
| 6,172,984 B1 * | 1/2001 | Beyda et al. | ......... | 370/448 |
| 6,438,634 B1 * | 8/2002 | Watanabe et al. | ......... | 710/110 |
| 6,473,817 B1 * | 10/2002 | Jeddeloh | ......... | 710/113 |
| 6,505,250 B2 * | 1/2003 | Freund et al. | ......... | 709/226 |
| 6,687,821 B1 * | 2/2004 | Hady et al. | ......... | 713/100 |
| 6,718,422 B1 * | 4/2004 | Kelley et al. | ......... | 710/309 |
| 6,934,781 B2 * | 8/2005 | Stone et al. | ......... | 710/118 |
| 6,976,109 B2 * | 12/2005 | Shenderovich | ......... | 710/243 |
| 7,035,277 B1 * | 4/2006 | Batcher | ......... | 370/447 |
| 7,058,741 B2 * | 6/2006 | Iwata et al. | ......... | 710/110 |

FOREIGN PATENT DOCUMENTS

| | | |
|---|---|---|
| JP | 57-103530 | 6/1982 |
| JP | 59-122257 | 7/1984 |
| JP | 60-169952 | 9/1985 |
| JP | 07-013923 | 1/1995 |
| JP | 09-204311 | 8/1997 |
| JP | 11-312138 | 11/1999 |
| JP | 2001-045095 | 2/2001 |
| JP | 2002-063130 | 2/2002 |

* cited by examiner

*Primary Examiner*—Christopher E. Lee
(74) *Attorney, Agent, or Firm*—Staas & Halsey LLP

(57) ABSTRACT

A priority determining unit determines a priority of a status of a device connected to a second bus that is connected, via a bridge, to a first bus to which a central processing unit and a storage unit are connected. A bus-status determining unit determines a use status of the second bus. A status writing unit writes the status to the storage unit based on a result of determination by the priority determining unit and a result of determination by the bus-status determining unit.

6 Claims, 8 Drawing Sheets

FIG.3

| LABEL | PRIORITY | BINARY CODE |
|---|---|---|
| FRAME CHECK ERROR | HIGH | 0001 |
| OVERSIZE | HIGH | 0003 |
| UNDERSIZE ERROR | HIGH | 0005 |
| RECEPTION COMPLETE | LOW | 0011 |
| TRANSMISSION COMPLETE | LOW | 0013 |
| ⋮ | ⋮ | ⋮ | ically significance of this invention will be
STATUS REPORTING APPARATUS AND STATUS REPORTING METHOD

CROSS REFERENCE TO RELATED APPLICATIONS

This application is based on and hereby claims priority to International Application No. PCT/JP03/08411 filed on Jul. 2, 2003, the contents of which are hereby incorporated by reference.

BACKGROUND OF THE INVENTION

1. Field of the Invention

The present invention relates to a method and apparatus for reporting a status of a device connected to a second bus that is connected, through a bridge, to a first bus to which a central processing unit and a storage unit are connected, with a capability of improving the usability of the second bus by eliminating the nonessential use of the second bus.

2. Description of the Related Art

In conventional technology, when a central processing unit (CPU) connected to a host bus (first bus) acquires a status of a device connected to a peripheral component interconnect (PCI) bus (second bus) that is connected to the host bus via a bridge, the CPU polls the status of the device.

FIG. 8 is a diagram for explaining a conventional device status reporting system. When a CPU 10 acquires, through a bridge 40, a status of a device C 800 that is connected to a PCI bus 50, the CPU 10 reads a status register 810 of the device C 800 through a host bus 30, the bridge 40, and the PCI bus 50. The technology in which the CPU reads the status of the device by polling is disclosed in Japanese Patent Application Laid-Open No. S59-122257.

Instead of the CPU 10 that polls the device C 800, the device C 800 writes the status to a memory 20 using a direct memory access (DMA) function and the CPU 10 reads the memory 20, thereby acquiring the status of the device C 800. The technologies for writing a device status to a memory using the DMA function is disclosed in, for example, Japanese Patent Application Laid-Open No. S57-103530, Japanese Patent Application Laid-Open No. 2001-45095, and Japanese Patent Application Laid-Open No. H09-204311.

In the case of a polling system, however, reading the status from the status register 810 is performed through the PCI bus 50 ((1) of FIG. 8), and in the case of a DMA system, writing the status to the memory 20 is performed through the PCI bus 50 ((2) of FIG. 8). Therefore, if an event of polling or DMA occurs during data transfer ((3) of FIG. 8) from a device A 60 to a device B 70, both of which are connected to the PCI bus 50, the data transfer is interrupted each time the event occurs, which leads to deterioration in data transfer efficiency of the PCI bus 50.

SUMMARY OF THE INVENTION

It is an object of the present invention to at least solve the problems in the conventional technology.

An apparatus according to one aspect of the present invention is for reporting a status of a device to a central processing unit. The device is connected to a second bus that is connected, via a bridge, to a first bus to which the central processing unit and a storage unit are connected. The apparatus includes a priority determining unit that determines a priority of the status; a bus-status determining unit that determines a use status of the second bus: and a status writing unit that writes the status to the storage unit based on a result of determination by the priority determining unit and a result of determination by the bus-status determining unit.

A method according to another aspect of the present invention is for reporting a status of a device to a central processing unit. The device is connected to a second bus that is connected, via a bridge, to a first bus to which the central processing unit and a storage unit are connected. The method includes determining a priority of the status; determining a use status of the second bus: and writing the status to the storage unit based on a result of determination at the determining a priority and a result of determination at the determining a use status.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram of an example of a priority determination table;

DETAILED DESCRIPTION OF THE PREFERRED EMBODIMENTS

Exemplary embodiments of the present invention are explained in detail below with reference to the accompanying drawings. A case of applying the present invention to a network controller is mainly explained.

Figure 1:
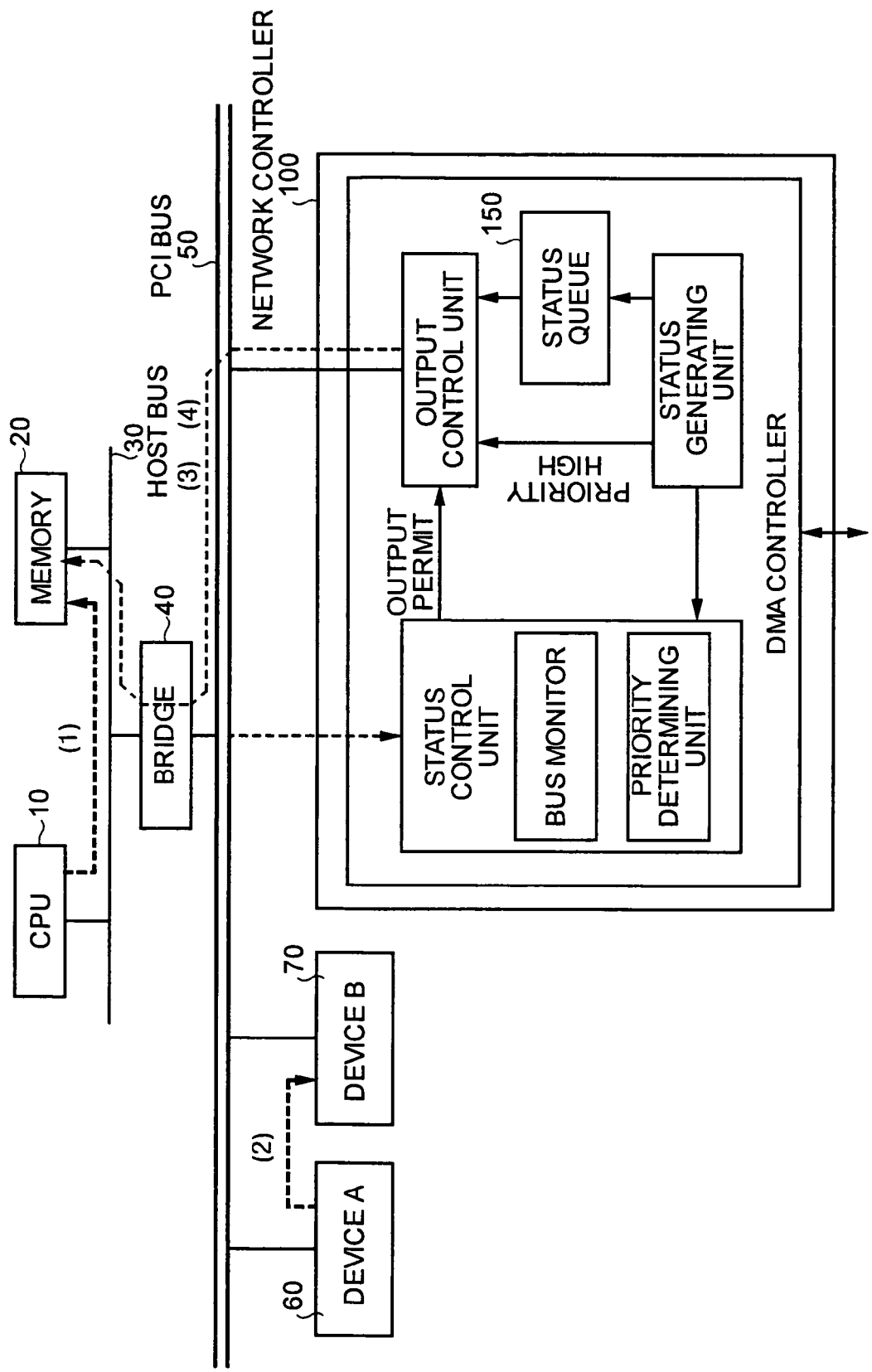
FIG. 1 is a diagram for explaining a concept of a device status reporting system according to one embodiment of the present invention.

FIG. 1 is a diagram for explaining the concept of a device status reporting system according to an embodiment of the present invention.

In the device status reporting system according to the present embodiment, a network controller 100 writes a status to the memory 20, and the CPU 10 polls the memory 20 instead of polling the network controller 100 to acquire the status of the network controller 100 ((1) of FIG. 1). Consequently, the PCI bus 50 is not in use when the CPU 10 polls the device status, and hence, data transfer is not interrupted even if polling by the CPU 10 occurs during the data transfer from the device A 60 to the device B 70 ((2) of FIG. 1).

The network controller 100 determines the priority of status to be reported to the CPU 10. If the priority is low, the network controller 100 does not write the status to the memory 20 immediately, but stores it in a status queue 150. Then, when the PCI bus 50 is not in use, the network controller 100 collectively writes low-priority statuses stored in the status queue 150, to the memory 20 through the PCI bus 50, the bridge 40, and the host bus 30 ((3) of FIG. 1).

Therefore, even if a status to be reported to the CPU 10 occurs during data transfer from the device A 60 to the device B 70, the data transfer is not interrupted if the priority of the status is low. However, if the priority of the status that occurs in the network controller 100 is high, the status is immediately written to the memory 20 ((4) of FIG. 1).

In the device status reporting according to the present embodiment as explained above, when a status is to be written to the memory 20 using the DMA function, the network controller 100 first determines the priority of the status, then, stores the status in the status queue 150 if the priority is low, and collectively writes statuses to the memory 20 when the PCI bus 50 is not in use, thereby efficiently using the PCI bus 50.

Figure 2:
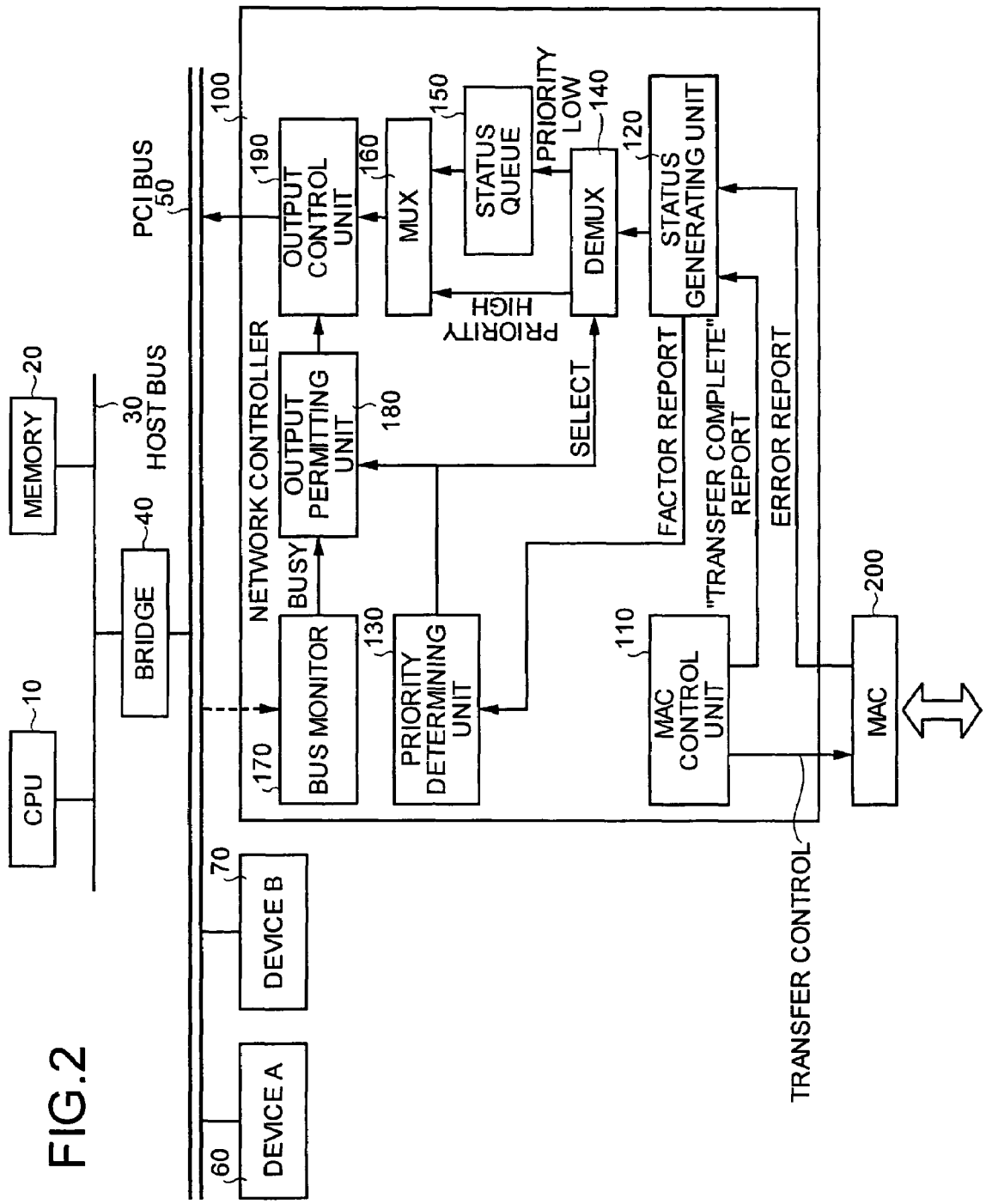
FIG. 2 is a functional block diagram of a network controller according to the present embodiment.

FIG. 2 is a functional block diagram of the network controller 100 according to the present embodiment.

The network controller 100 includes a media-access-control (MAC) control unit 110, a status generating unit 120, a priority determining unit 130, a DEMUX 140, the status queue 150, a MUX 160, a bus monitor 170, an output permitting unit 180, and an output control unit 190.

The MAC control unit 110 is a processor that controls data transfer to/from a MAC 200. The MAC 200 is a device that performs data exchange with the network.

The status generating unit 120 is a processor that receives a factor to be reported to the CPU 10 such as an error report from the MAC 200 and a data transfer complete report from the MAC control unit 110, and that generates a status to be reported to the CPU 10.

The priority determining unit 130 is a processor that receives the factor of the status from the status generating unit 120 and determines the priority of the status. More specifically, the priority determining unit 130 determines the priority of the status using a priority determination table.

FIG. 3 is a diagram of an example of a priority determination table (or priority table). The priority determination table stores a label indicating a type of a status, a priority of a status, and a binary code identifying a status, in a corresponding manner.

For example, the status of which label is "frame check error" indicates that its priority is high and the binary code is "0001". The status of which label is "reception complete" indicates that its priority is low and the binary code is "0011".

The DEMUX 140 is a processor that selects whether to directly send the status to the output control unit 190 or to store the status in the status queue 150, based on the result of determination on the priority of the status by the priority determining unit 130. In other words, if the priority determining unit 130 determines that the priority of the status is high, the DEMUX 140 directly transmits the status to the output control unit 190, but if the priority determining unit 130 determines that the priority of the status is low, the DEMUX 140 stores the status in the status queue 150.

In this manner, the priority determining unit 130 determines the priority of the status, and if it is determined that the priority of the status is low, then the DEMUX 140 stores the status in the status queue 150 to suspend the output to the PCI bus 50, thereby avoiding nonessential use of the PCI bus 50.

The status queue 150 is a memory that temporarily stores statuses determined by the priority determining unit 130 that their priorities are low, and stores low-priority statuses when the PCI bus 50 is in use. Then, the statuses stored in the status queue 150 are collectively transferred to the output control unit 190 when the PCI bus 50 is not in use.

The MUX 160 is a processor that transfers a high-priority status received from the DEMUX 140 or a low-priority status stored in the status queue 150, to the output control unit 190.

The bus monitor 170 is a processor that always monitors the status of the PCI bus 50 and determines whether the PCI bus 50 is in use, and reports the result of determination to the output permitting unit 180.

The output permitting unit 180 is a processor that permits to write the status to the memory 20 based on the priority of the status and the use status of the PCI bus 50. More specifically, when the priority of the status is high, the output permitting unit 180 permits to write the status to the memory 20 irrespective of the use status of the PCI bus 50, and when the priority of the status is low, the output permitting unit 180 permits to write the status to the memory 20 if the PCI bus 50 is not in use.

When the priority of the status is low, the output permitting unit 180 permits to write the status to the memory 20 only when the PCI bus 50 is not in use, and this allows elimination of nonessential use of the PCI bus 50 and efficient use thereof.

The output control unit 190 is a processor that receives "output permit" from the output permitting unit 180 and writes the status to the memory 20 through the PCI bus 50, the bridge 40, and the host bus 30.

Figure 4:
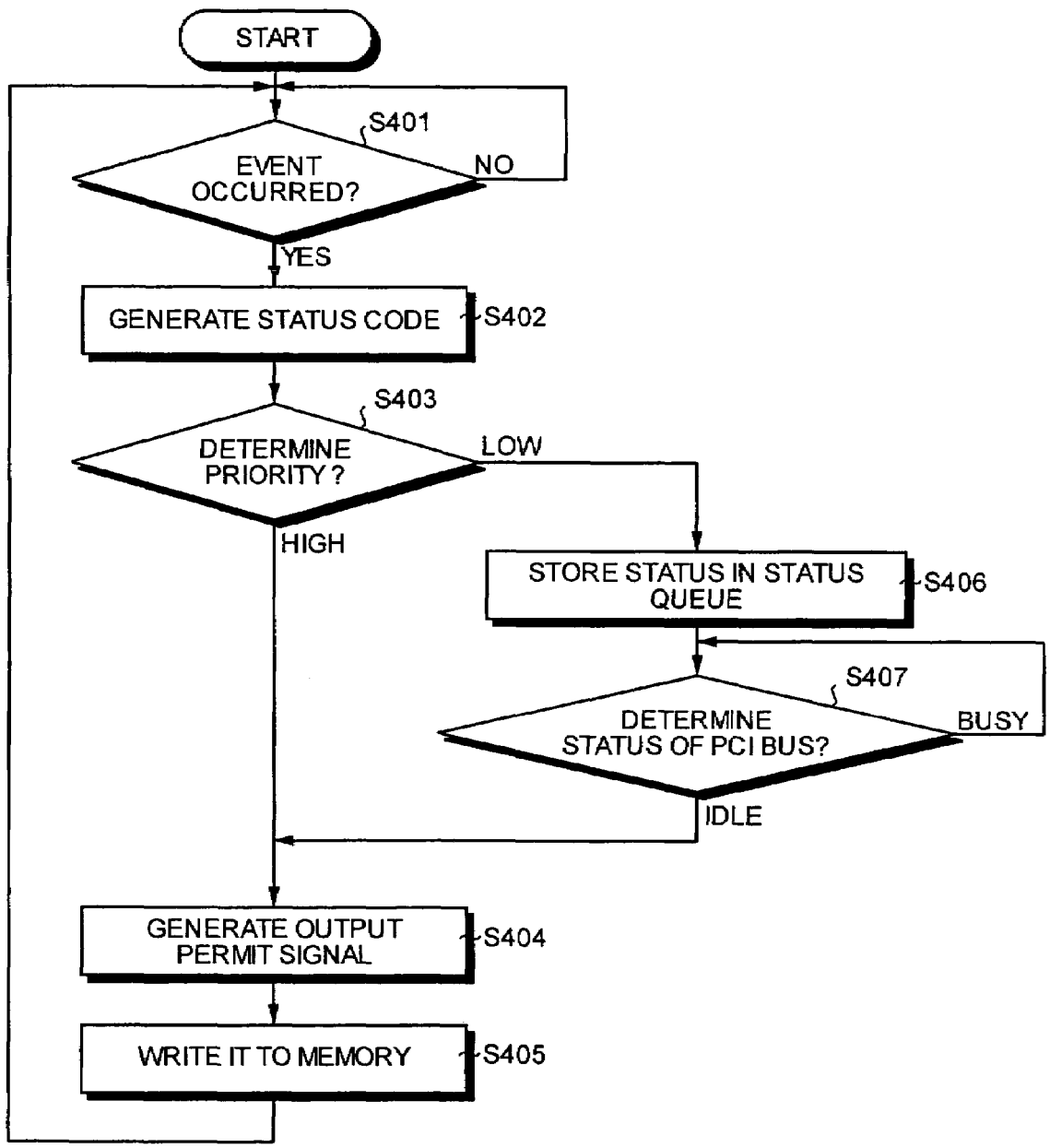
FIG. 4 is a flowchart of a status report operation by the network controller according to the present embodiment.

FIG. 4 is a flowchart of a status report operation by the network controller 100 according to the present embodiment.

In the network controller 100, when an event necessary to be reported to the CPU 10 occurs (step S401, Yes), the status generating unit 120 generates status code (step S402) and reports its factor to the priority determining unit 130.

Then, the priority determining unit 130 determines the priority of the status (step S403). If the priority is high, then the output permitting unit 180 generates an output permit signal (step S404), and the output control unit 190 writes the status to the memory 20 (step S405).

On the other hand, if the priority is low, the DEMUX 140 stores the status in the status queue 150 (step S406). The output permitting unit 180 refers to the use status of the PCI bus 50 determined by the bus monitor 170, and does not permit output of the status while the PCI bus 50 is busy (step S407, busy).

When the PCI bus 50 is idle or becomes idle (step S407, idle), the output permitting unit 180 generates the output permit signal (step S404), and the output control unit 190 collectively writes the statuses stored in the status queue 150 to the memory 20 (step S405).

In the above manner, the priority determining unit 130 determines the priority of the status, and the output permitting unit 180 generates an output permit signal based on the priority of the status and the use status of the PCI bus 50, and this allows elimination of nonessential use of the PCI bus 50 and efficient use thereof.

Figure 5:
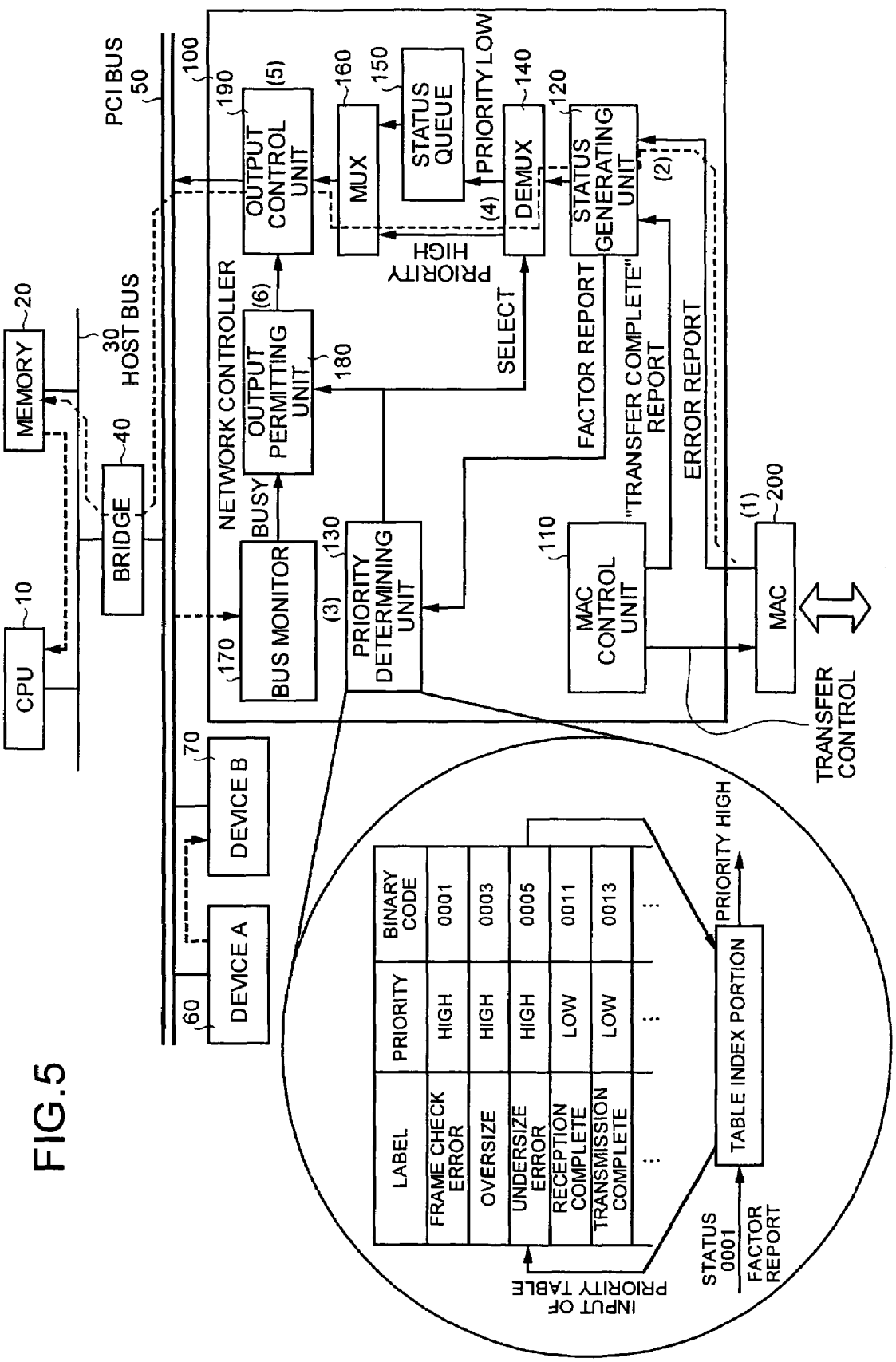
FIG. 5 is a diagram for explaining a high-priority-status report operation by the network controller according to the present embodiment.

FIG. 5 is a diagram for explaining a high-priority-status report operation by the network controller 100 according to the present embodiment.

For example, the MAC 200 detects a frame check error ((1) of FIG. 5), and reports the error to the status generating unit 120 ((2) of FIG. 5). Then, the status generating unit 120 generates a status of the frame check error and reports its factor to the priority determining unit 130. The priority determining unit 130 determines that the priority of the frame check error is high, using the priority table ((3) of FIG. 5).

Then, the DEMUX 140 receives the determination result ((4) of FIG. 5), and transfers the status to the output control unit 190 through the MUX 160 ((5) of FIG. 5). On the other hand, the output permitting unit 180 receives the determination result by the priority determining unit 130, generates an output permit signal irrespective of the use status of the PCI bus 50, and transfers the signal to the output control unit 190 ((6) of FIG. 5). The output control unit 190 writes the status of the frame check error to the memory 20.

As explained above, in the network controller 100, the status having the high priority such as the frame check error is immediately written to the memory 20 irrespective of the use status of the PCI bus 50.

Figure 6:
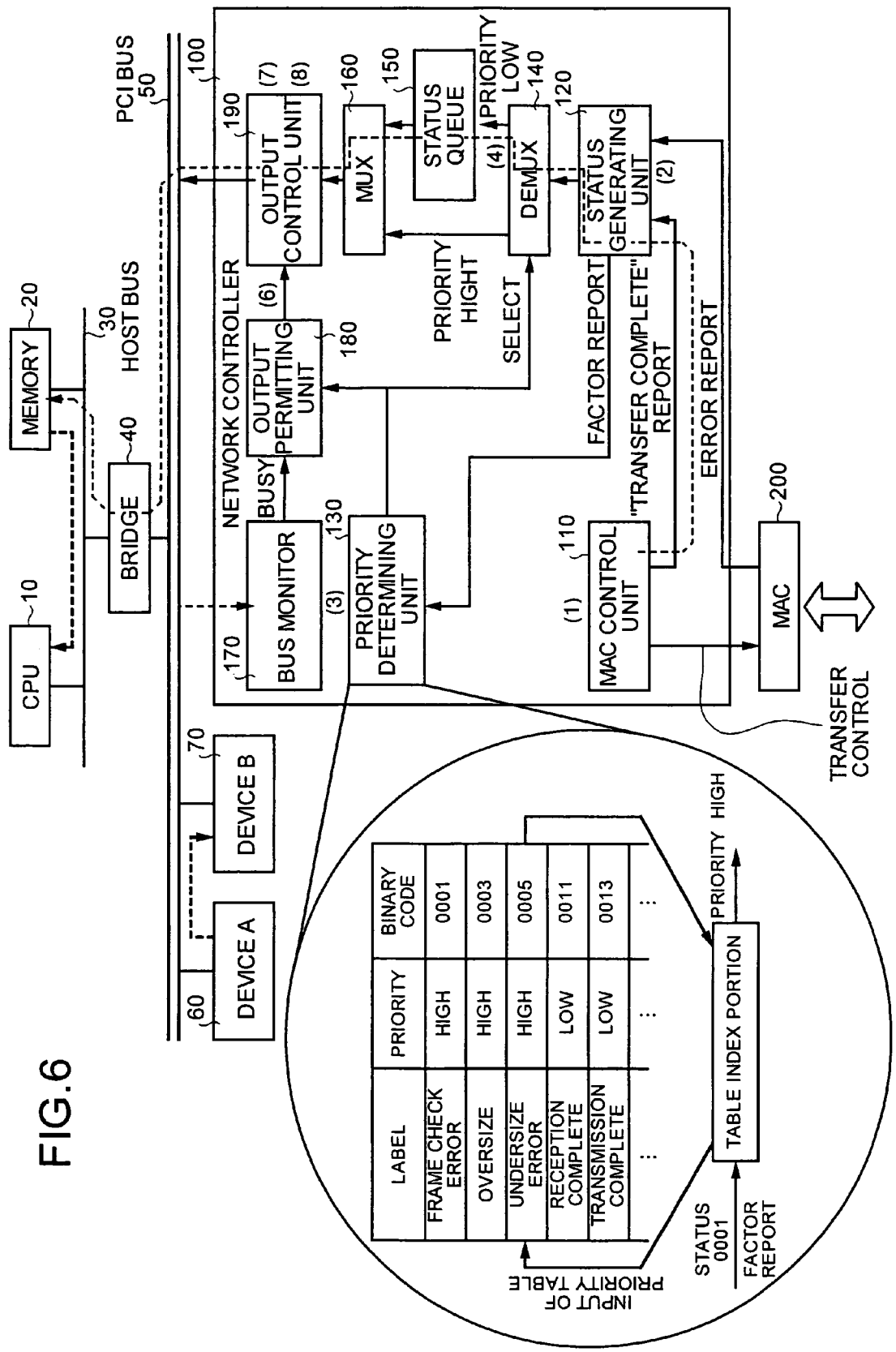
FIG. 6 is a diagram for explaining a low-priority-status report operation by the network controller according to the present embodiment.

FIG. 6 is a diagram for explaining a low-priority-status report operation by the network controller 100 according to the present embodiment.

For example, the MAC control unit 110 completes data reception ((1) of FIG. 6), and reports "transfer complete" to the status generating unit 120 ((2) of FIG. 6). Then, the status generating unit 120 generates a status of "reception complete" and reports its factor to the priority determining unit 130. The priority determining unit 130 determines that the priority of "reception complete" is low, using the priority table ((3) of FIG. 6).

The DEMUX 140 receives the determination result ((4) of FIG. 6), and stores the status in the status queue 150. On the other hand, the output permitting unit 180 receives the determination result by the priority determining unit 130, and refers to the result of determination on the use status of the PCI bus 50 by the bus monitor 170 ((5) of FIG. 6). If the PCI bus 50 is not in use, then the output permitting unit 180 generates an output permit signal and transfers the signal to the output control unit 190 ((6) of FIG. 6). The output control unit 190 writes the status of "reception complete" to the memory 20 ((7) of FIG. 6).

In contrast, if the PCI bus 50 is in use, then the output permitting unit 180 waits until the PCI bus 50 becomes not in use, generates an output permit signal when the PCI bus 50 becomes not in use, and transfers the signal to the output control unit 190 ((6) of FIG. 6). The output control unit 190 writes the status of "reception complete" to the memory 20 ((8) of FIG. 6).

As explained above, the network controller 100 writes the status having the low priority such as "reception complete" to the memory 20 when the PCI bus 50 is not in use.

Figure 7:
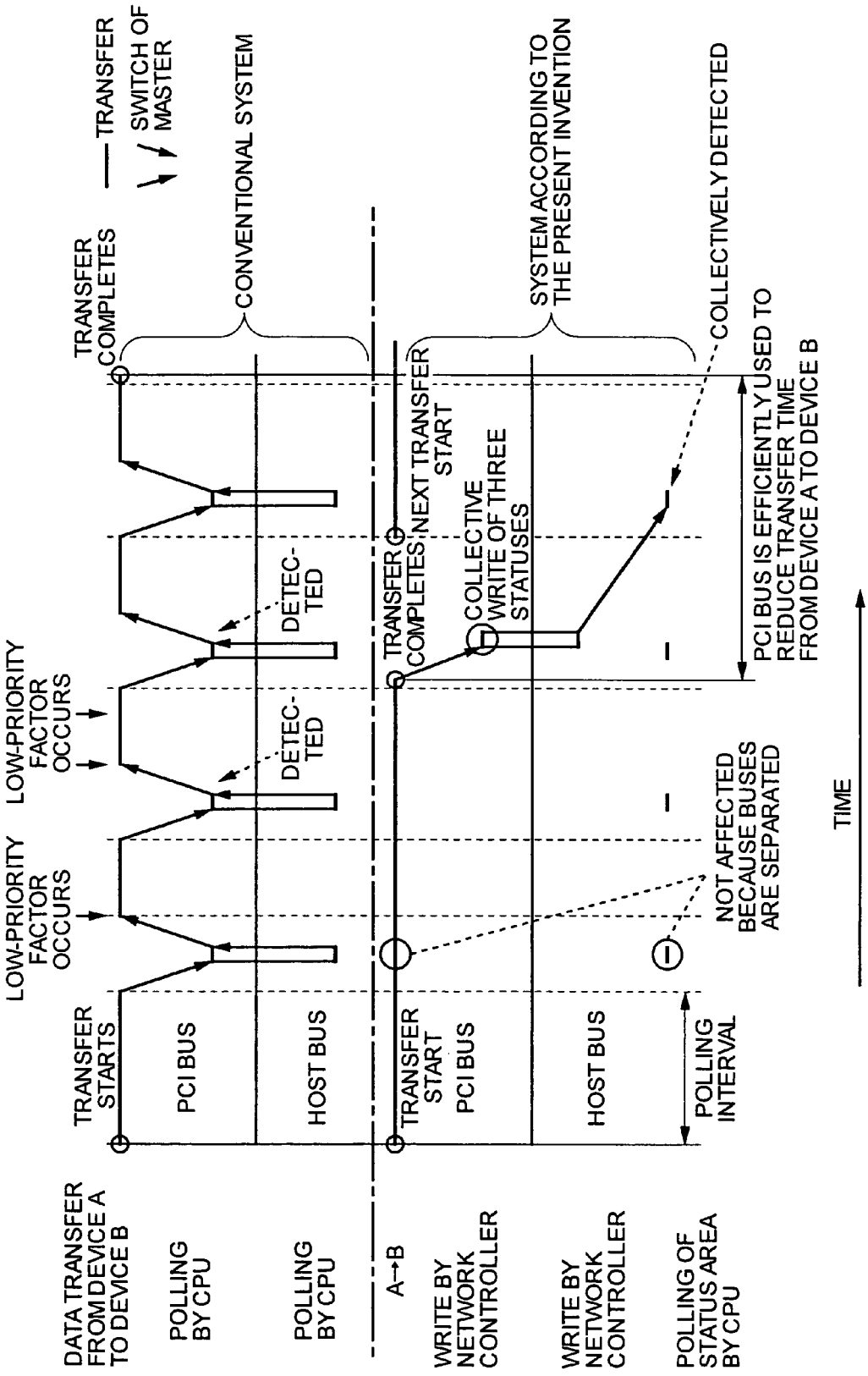
FIG. 7 is a time chart of a PCI bus and a host bus when a factor that needs to report a status occurs in the network controller during data transfer from a device A to a device B.
Figure 8:
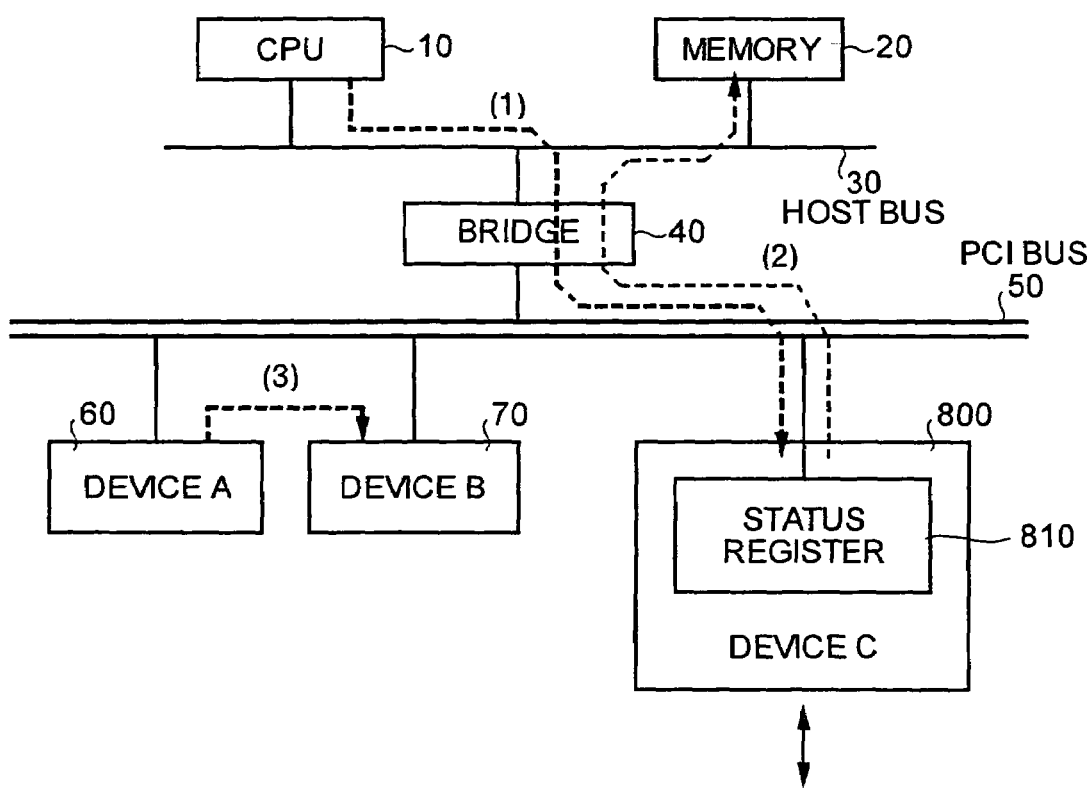
FIG. 8 is a diagram for explaining the conventional device status reporting system.

The operation of the PCI bus 50 when the conventional polling system is used by the CPU 10 and the operation of the PCI bus 50 when the status reporting system according to the present invention is used are explained below. FIG. 7 is a time chart of the PCI bus 50 and the host bus 30 when a factor that needs to report a status occurs in the network controller 100 during data transfer from the device A 60 to the device B 70.

In the conventional polling system used by the CPU 10, when the polling by the CPU 10 occurs during data transfer from the device A 60 to the device B 70, the PCI bus 50 is used by the CPU 10 each time it occurs, and the data transfer is thereby interrupted. Factors that need to report three low-priority statuses having occurred in the network controller 100 are detected through polling by the CPU 10 after the factors have occurred.

On the other hand, in the status reporting system according to the present embodiment, when factors that need to report low-priority statuses have occurred in the network controller 100 during data transfer from the device A 60 to the device B 70, the factors having occurred are kept stored in the status queue 150 until the data transfer is complete, and the three factors are collectively written to the memory 20 when the data transfer is complete. Therefore, early completion of the data transfer from the device A 60 to the device B 70 is achieved with no interruption, which allows the PCI bus 50 to be efficiently used.

Furthermore, in the status reporting system according to the present embodiment, the CPU 10 polls the memory 20 and acquires the status of the network controller 100. Therefore, only the host bus 30 is used for polling, and hence, there is no need to use the PCI bus 50.

According to the present embodiment, the priority determining unit 130 determines the priority of the status having occurred in the network controller 100. If the priority is low, then the DEMUX 140 stores the low-priority status in the status queue 150. The bus monitor 170 determines the use status of the PCI bus 50, and the output permitting unit 180 permits to write the status stored in the status queue 150 only when the PCI bus 50 is not in use, which allows elimination of nonessential use of the PCI bus 50 and efficient use thereof.

Furthermore, according to the present embodiment, a case in which the status of the network controller 100 connected to the PCI bus is reported to the CPU connected to the host bus that is connected to the PCI bus via a bridge, has been explained. However, the present invention is not limited thereto, and hence, the present invention is also applicable to reporting of the status of a device other than the network controller 100 or of the status of a device connected to any bus other than the PCI bus.

According to the present invention, the nonessential use of the second bus is eliminated, thereby improving the usability of the second bus.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for reporting a status of a device to a central processing unit, the device being connected to a second bus that is connected, via a bridge, to a first bus to which the central processing unit and a storage unit are connected, the apparatus comprising:

a priority determining unit that determines a priority of the status;

a bus-status determining unit that determines a use status of the second bus; and a status writing unit that writes the status to the storage unit based on a first result of determination by the priority determining unit and a second result of determination by the bus-status determining unit.

2. The apparatus according to claim 1, wherein when the first result of determination indicates that the priority of the status is high, the status writing unit writes the status to the storage unit regardless of the second result of determination, when the first result of determination indicates that the priority of the status is low, the status writing unit stores the status in a queue, and when the second result of determination indicates that the second bus is not in use, the status writing unit writes the status stored in the queue to the storage unit.

3. The apparatus according to claim 1, further comprising:

a priority table that stores the status and the priority in a corresponding manner, wherein the priority determining unit determines the priority based on the priority table.

4. A method of reporting a status of a device to a central processing unit, the device being connected to a second bus that is connected, via a bridge, to a first bus to which the central processing unit and a storage unit are connected, the method comprising:

determining a priority of the status;

determining a use status of the second bus; and writing the status to the storage unit based on a first result of determination at the determining a priority and a second result of determination at the determining a use status.

5. The status reporting apparatus according to claim 4, wherein when the first result of determination indicates that the priority of the status is high, the writing includes writing the status to the storage unit regardless of the second result of determination, when the first result of determination indicates that the priority of the status is low, the writing includes storing the status in a queue, and when the second result of determination indicates that the second bus is not in use, the writing includes writing the status stored in the queue to the storage unit.

6. The status reporting apparatus according to claim 4, further comprising:

storing the status and the priority in a corresponding manner in a priority table, wherein the determining a priority includes determining the priority based on the priority table.

* * * * *